3,355,737
RADIO DIRECTION FINDERS
Dennis William George Byatt, Great Baddow, England, assignor to The Marconi Company Limited, London, England, a British company
Filed Feb. 14, 1966, Ser. No. 527,225
Claims priority, application Great Britain, Mar. 2, 1965, 8,944/65
11 Claims. (Cl. 343—118)

ABSTRACT OF THE DISCLOSURE

A radio direction finder is provided having an aerial system which is rotatable in azimuth. The aerial system includes a connected composite arrangement, comprising a vertical dipole in the axis of a horizontal loop, connected to the direction finding receiver, and a parasitic composite arrangement consisting of a parasitic reflecting dipole in the axis of a parasitic reflecting horizontal loop, the dipole of the composite arrangement being connected to the receiver and the parasitic dipole being spaced apart by a quarter of a wave-length along a line which is at right angles to the axis of rotation. Between the connected composite arrangement and the direction finding receiver, a switch arrangement is inserted which connects signals from the dipole and signals from the horizontal loop alternately to the receiver at a frequency of alternation which is high in relation to the rotational speed of the system (e.g. where the system rotates at 60 r.p.m. the switch frequency may be 1.5 kc./s.). In one embodiment, one pair of composite arrangements (i.e., a parasitic dipole and loop and a connected dipole and loop) operating at V.H.F. and a further pair of composite arrangements, operating at U.H.F., are disposed on opposite sides of the axis of rotation of the system.

---

This invention relates to radio direction finders and more particularly to radio direction finders for finding the direction of incoming very high frequency (V.H.F.) or ultra high frequency (U.H.F.) waves.

Directional errors due to polarisation effects are commonly experienced with the usual known forms of V.H.F. and U.H.F. direction finders, e.g., direction finders employed to find the directions of signals from aircraft. These errors occur, in general, because of variations in the polarisation of received signals due to variations in the altitude of the transmitting aircraft and numerous other possible causes. The receiving aerial system of a V.H.F. or U.H.F. radio direction finder is usually installed in a fairly high position and its polar field strength diagram in the vertical plane commonly exhibits a number of lobes with vertical arcs of low received field strength between them. If an incoming signal arrives in one of these arcs the field strength for the polarisation component (usually the vertical component) which the aerial system is designed to receive may be so low that, if the unwanted polarisation component (assumed horizontal) is present in any strength, it may cause serious directional error. Variations in the polarisation of received signals may and often do cause serious, unknown, varying directional errors.

The present invention seeks to provide improved radio direction finders which will avoid the above-mentioned defects; be relatively simple; require the use of aerial systems which are relatively small and compact and occupy but little space; and which, despite the small area occupation of the aerial system, will produce results comparable to those obtainable with a wide-aperture fixed multiaerial system.

According to this invention a radio direction finder comprises at least one composite aerial system including a directional aerial adapted to receive substantially only vertically polarised incoming waves and a directional aerial adapted to receive substantially only horizontally polarised incoming waves; rotational driving means for said aerial system to cause the aerials thereof to swing their directions in azimuth with a common instantaneous direction; a receiver; switch means for supplying signals from the aerials of said system alternately to said receiver at a frequency of alternation which is high in relation to the rotational speed of the system; and means for utilising the output of the receiver to ascertain the direction of incoming waves.

Preferably the aerial system is continuously rotated in azimuth. It may be rotated about its own axis, by which is here meant about an axis which is centrally positioned with respect to the aerial elements of which it is composed, so that said elements are symmetrically disposed with respect to the axis of rotation. It is, however, preferred to rotate the aerial system about an external axis so that the rotational movement is a circular movement round the axis. By suitably choosing the elements of the aerial system the effective aperture may be made quite large with respect to the wave length for the effective aperture is the diameter of the circular path round the axis.

A preferred form of aerial system comprises a connected vertical dipole in the axis of a connected horizontal loop and symmetrical with respect thereto, and a parasitic reflecting vertical dipole similarly in the axis of a parasitic reflecting horizontal loop and symmetrical with respect thereto, the two dipoles being spaced apart by approximately a quarter wave length along a line which is at right angles to the axis of rotation. By placing all these elements on the same side of an external axis of rotation a large effective aerial aperture (in terms of wave length) can be obtained since the distance between the aerial system and the axis can be increased as desired up to a limit set by practical mechanical considerations. It is possible, of course, to mount the connected elements on one side of the axis and the parasitic elements diametrically opposite on the other side of the axis but if this is done the effective aperture will be small since the spacing between connected and parasitic elements will be at most only one quarter of a wave length.

Preferably signals received on the vertically polarised and horizontally polarised aerials of the aerial system are fed respectively to the two inputs of a continuously driven electronic switch which supplies signals fed to said two inputs alternately and in turn to a common receiver. Coupling of the signals to the two inputs of the switch may conveniently be effected through rotating couplers. The output of the receiver may be fed to a phase detector to which is also fed a frequency of reference phase representative of aerial system rotation, the output of the phase detector being fed to a direction indicator (i.e., a cathode ray tube) to indicate incoming signal direction. The frequency of reference phase may be conveniently derived from a generator driven by a motor rotating the aerial system.

The switching frequency should be high in relation to the rotation speed. Thus, to quote practical figures purely by way of example, if the rotation speed is 60 r.p.m. a switching frequency of 1.5 kc./s. could be employed. This would give a switch change over at (approximately) each quarter of a degree of aerial system rotation.

The invention lends itself to the combination of a V.H.F. direction finder and a U.H.F. direction finder in what is virtually a single direction finder with much of its equipment common to both. Ine one arrangement of this kind there are two aerial systems (one for V.H.F. and the other for U.H.F.) rotatable together by a common motor about a common axis of rotation, two electronic switches which may be driven by a common driving source, two receivers, a common source of frequency of reference phase, a common phase detector and a common direction indicator, one switch being arranged to supply signals from the aerials of one system alternately to the receiver, the other switch being arranged to supply signals from the aerials of the other system alternately to the receiver, and manually operable selection means being provided for selecting either aerial system for supplying signals through its associated switch to the common receiver. In such an arrangement it is preferable to arrange the two aerial systems symmetrically on opposite sides of an axis of rotation, one on one side and the other on the other. In this way large effective apertures are obtained for both systems.

The invention is illustrated in the accompanying drawings in which.

Figures 1, 2:
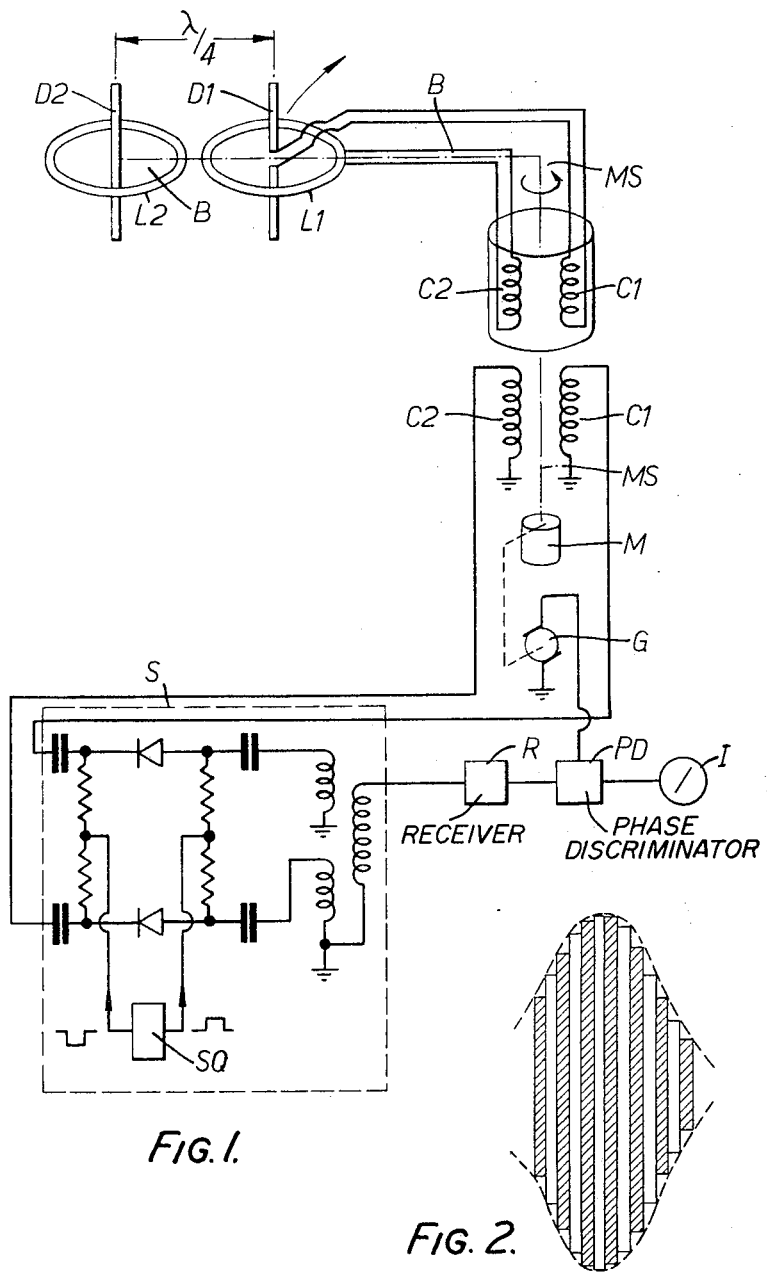
FIGURE 1 is a simplified schematic representation of one embodiment.
FIGURE 2 is an explanatory graphical figure.

Referring to FIGURE 1 the direction finder therein represented has an aerial system comprising two vertical dipoles D1, D2 and two horizontal loops L1, L2. Each dipole D1 or D2 is symmetrically positioned in the axis of a loop L1 or L2. D1 and L1 are connected (i.e. are arranged to feed into a receiver) and D2 and L2 are parasitic. The dipoles D1 and D2 are spaced approximately a quarter of a wave length apart. It will thus be apparent that the aerial system D1, D2, L1, L2 is a directional system consisting of two aerials, one comprising the elements D1 and D2 and the other comprising the elements L1 and L2, each aerial having a polar diagram of the cardioid type and one (comprising D1, D2) being vertically polarised and the other (comprising L1 and L2) being horizontally polarised.

The aerial system is rotated about an external vertical axis by an electric motor M, the elements of the system being mounted as indicated on a horizontal radial boom represented by the chain line B. The boom which, in practice would be mechanically balanced, is rotated by a shaft driven by the motor M and represented by the chain line MS. The motor may, in a practical case, rotate the boom at, say 60 r.p.m. and also drives a source of reference phase. This is represented as a generator G which will, for the rotational speed mentioned, produce a reference of 1 c./s.

Signals from the two elements D1 and L1 are fed via rotational couplers represented purely diagrammatically at C1 and C2 respectively, to the inputs of an electronic switch S. The switch, one simple form of which is shown diagrammatically and the operation of which will be self-evident from the figure, alternately supplies the signals at its two inputs to a receiver R. It is driven by a square wave source SQ, the frequency of which is such as to provide a switching frequency which is high in relation to the rotation speed, e.g., it may be 1.5 kc./s.

The 1 c./s. component of output from the switch is derived in the receiver R and fed to a phase detector PD in which it is compared in phase with the reference frequency from G. The resultant of phase comparison is employed in manner well known per se in radio direction finder practice, to operate a cathode ray tube or other indicator I which displays the incoming signal direction.

FIGURE 2 is a diagram illustrating the result obtained at the input to the receiver R if an incoming signal which is polarised at 45° is received when the direction finder is in operation. The diagram is composed of areas alternate ones of which are shaded to distinguish between vertically polarised components and horizontally polarised components. With a relation between switching frequency and rotational speed as high as that mentioned above, the number of areas in FIGURE 2 would be much higher than, and the individual areas would be much thinner than, those shown but, for convenience and clarity of drawing, only a few comparatively wide areas, such as would be obtained with a much lower switching frequency, are shown. The diagram of FIGURE 2 shows equal sensitivity to vertical and horizontal polarisation components but this is, of course, not essential, the only requirement being that the directions of cardioid minima and maxima shall be the same for both polarisation components. FIGURE 2 is, as stated, drawn for 45° polarisation, i.e., equality of vertical and horizontal polarisation components. If either component predominates the alternate areas of FIGURE 2 corresponding to the other component will become of smaller relative amplitude (disappearing altogether in the limit) but the overall envelope shape will remain practically the same and the basic envelope phase will remain the same.

Figure 3:
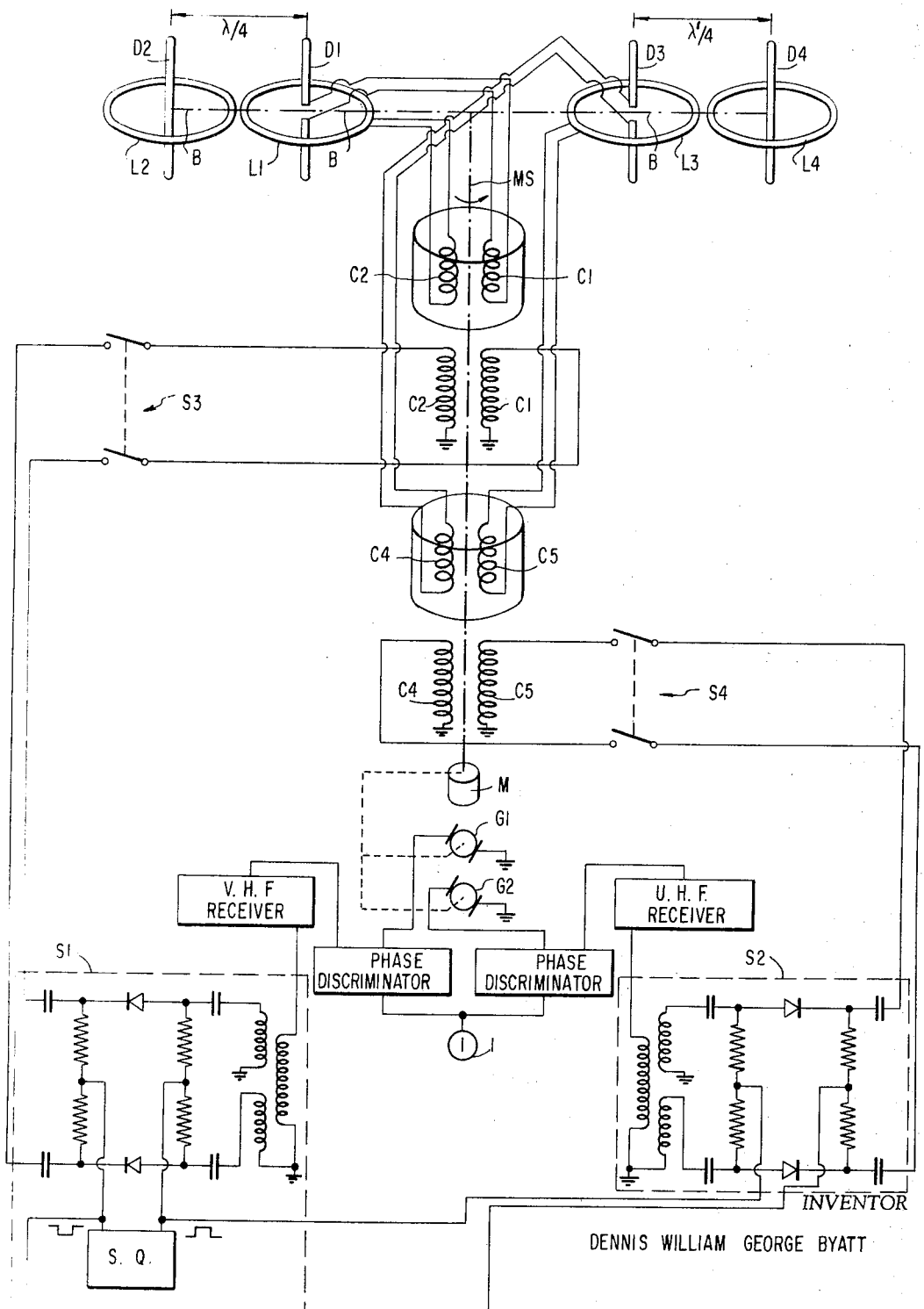
FIGURE 3 is a schematic representation of a further embodiment including U.H.F. and V.H.F. provisions.

As illustrated in FIGURE 3, wherein similar elements are similarly labelled, there may be more than one aerial system. Thus, if a combined V.H.F. and U.H.F. direction finder is required there are two aerial systems, one for V.H.F. and the other for U.H.F. on the boom B. Each comprises two dipoles D1, D2, and D3, D4, and two loops L1, L2 and L3, L4, as illustrated in FIGURE 3 and spaced apart approximately by a quarter of a wave length (at the appropriate V.H.F. or U.H.F. frequency) but one aerial system is on one side of the axis of rotation and the other on the other. The two aerial systems should be spaced apart by more than a half-wave length at V.H.F.—anything above this figure up to about 4 wave lengths is practical. There are two electronic switches S1 and S2, like the switch S described hereinbefore, which are driven by a common switching source SQ. The rotational coupler arrangement of course comprises coupling means C1, C2, C3 and C4 coupling the two aerials of one system to the two inputs of one system switch and the two aerials of the other system to the two inputs of the other switch. Each of the two aerial systems provides signals to an appropriate receiver (V.H.F. or U.H.F. as the case may be) upon the appropriate actuation of the manually operable selection means including switches S3 and S4. Such switches S3 and S4 may, of course, be commonly electrically or mechanically operated to choose the aerial system desired. It is possible to use the same phase detector PD, indicator I and reference phase source G for both V.H.F. and U.H.F. reception, but generally, in practice, this would not be done. Rather, two sources G1, G2, each corresponding to previously described source G, are employed as well as two phase discriminators, again, as previously discussed, are employed in combination with a single indicator I.

I claim:

1. A radio direction finder comprising at least one composite aerial system including a directional aerial adapted to receive substantially only vertically polarised incoming waves and a directional aerial adapted to receive substantially only horizontally polarised incoming waves; rotational driving means for said aerial system to cause the aerials thereof to swing their directions in azimuth with a common instantaneous direction; a receiver; switch means for supplying signals from the aerials of said system alternately to said receiver at a frequency of alteration which is high in relation to the rotational speed of the system; and means for utilising the output of the receiver to ascertain the direction of incoming waves.

2. A direction finder as claimed in claim 1 wherein the aerial system is continuously rotated in azimuth.

3. A direction finder as claimed in claim 1 wherein the aerial system is rotated about an axis which is centrally positioned with respect to the aerial elements of which it is composed.

4. A direction finder as claimed in claim 1 wherein the aerial system is rotated about an external axis so that the rotational movement is a circular movement round the axis.

5. A direction finder as claimed in claim 1 wherein the aerial system comprises a connected vertical dipole in the axis of a connected horizontal loop and symmetrical with respect thereto, and a parasitic reflecting dipole similarly in the axis of a parasitic reflecting horizontal loop and symmetrical with respect thereto, the two dipoles being spaced apart by approximately a quarter wave length along a line which is at right angles to the axis of rotation.

6. A direction finder as claimed in claim 5 wherein all the elements of the aerial system are on the same side of an external axis of rotation.

7. A direction finder as claimed in claim 5 wherein the connected elements of the aerial system are on one side of the axis and the parasitic elements diametrically opposite on the other side of the axis.

8. A direction finder as claimed in claim 1 wherein signals received on the vertically polarised and horizontally polarised aerials of the aerial system are fed respectively to the two inputs of a continuously driven electronic switch which supplies signals fed to said two inputs alternately and in turn to a common receiver.

9. A direction finder as claimed in claim 8 wherein the output of the receiver is fed to a phase detector to which is also fed a frequency of reference phase representative of aerial system rotation, the output of the phase detector being fed to a direction indicator.

10. A combined V.H.F. and U.H.F. radio direction finder in accordance with claim 1 wherein there are two aerial systems, one for V.H.F. and the other for U.H.F., rotatable together by a common motor about a common axis of rotation, two electronic switches, two receivers, at least one source of frequency of reference phase, at least one phase detector and at least one direction indicator, one switch being arranged to supply signals from the aerials of one system alternately to the receiver, the other switch being arranged to supply signals from the aerials of the other system alternately to the receiver, and manually operable selection means being provided for selecting either aerial system for supplying signals through its associated switch to the associated receiver.

11. A direction finder as claimed in claim 10 wherein the two aerial systems are arranged symmetrically on opposite sides of an axis of rotation, one on one side and the other on the other.

References Cited

UNITED STATES PATENTS

| 2,422,107 | 6/1947 | Luck. | |
|---|---|---|---|
| 2,953,782 | 9/1960 | Byatt | 343—118 |

FOREIGN PATENTS

| 507461 | 6/1939 | Great Britain. |
|---|---|---|

RODNEY D. BENNETT, *Primary Examiner.*

R. E. BERGER, *Assistant Examiner.*